United States Patent
Browne et al.

(10) Patent No.: US 7,178,395 B2
(45) Date of Patent: Feb. 20, 2007

(54) CONTROL LOGIC FOR FLUID FLOW CONTROL DEVICES

(75) Inventors: Alan L. Browne, Grosse Pointe, MI (US); Nancy L. Johnson, Northville, MI (US); Tadge J. Juechter, Troy, MI (US); Edward D. Moss, Commerce Township, MI (US); Jan H. Aase, Oakland Township, MI (US); Thomas H. Froling, Clinton Township, MI (US); Gary L. Jones, Farmington Hills, MI (US); Bahram Khalighi, Troy, MI (US); Constantinos A. Koromilas, Sterling Heights, MI (US); Harlan W. Charles, Harper Woods, MI (US); Geoffrey P. McKnight, Los Angeles, CA (US); William Barvosa-Carter, Ventura, CA (US); Leslie A. Momoda, Los Angeles, CA (US); Franz K. Schenkel, Rochester, MI (US); Lawrence E. Peruski, Canton, MI (US); Jeffrey M. Pleune, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 28 days.

(21) Appl. No.: 10/984,011

(22) Filed: Nov. 5, 2004

(65) Prior Publication Data
US 2006/0096365 A1 May 11, 2006

(51) Int. Cl.
*B60G 1/00* (2006.01)

(52) U.S. Cl. .............................. 73/170.11; 296/180.5; 244/201

(58) Field of Classification Search ............. 73/170.01, 73/170.11; 702/45; 296/180.5
See application file for complete search history.

(56) References Cited

U.S. PATENT DOCUMENTS

| | | | | |
|---|---|---|---|---|
| 3,816,774 | A * | 6/1974 | Ohnuki et al. | 310/332 |
| 5,558,304 | A * | 9/1996 | Adams | 244/134 A |
| 5,662,294 | A * | 9/1997 | Maclean et al. | 244/219 |
| 5,803,409 | A * | 9/1998 | Keefe | 244/206 |
| 6,236,139 | B1 * | 5/2001 | Hill et al. | 310/307 |
| 6,261,174 | B1 | 7/2001 | Kuehn | 454/290 |
| 6,327,948 | B1 * | 12/2001 | Tuori | 83/53 |
| 6,484,971 | B2 * | 11/2002 | Layukallo | 244/130 |
| 6,833,656 | B2 * | 12/2004 | Hooley et al. | 310/369 |
| 6,863,242 | B2 * | 3/2005 | Van De Kreeke et al. | 244/7 R |
| 6,926,346 | B1 * | 8/2005 | Wong et al. | 296/180.5 |
| 6,948,910 | B2 * | 9/2005 | Polacsek | 416/1 |
| 2004/0197519 | A1 * | 10/2004 | Elzey et al. | 428/68 |

* cited by examiner

Primary Examiner—Edward Lefkowitz
Assistant Examiner—Andre Allen
(74) Attorney, Agent, or Firm—Kathryn A. Marra

(57) ABSTRACT

A system for controlling fluid flow about a vehicle. The system comprises a fluid flow control device, an obstacle sensor for detecting obstacles, and a controller. The fluid flow control device has a body with at least one surface and an actuation means in operative communication with the surface. The actuation means is operative to alter at least one attribute of the fluid flow control device in response to a control signal. The controller has control logic for generating the control signal in response to the obstacle sensor.

18 Claims, 8 Drawing Sheets

US 7,178,395 B2

CONTROL LOGIC FOR FLUID FLOW CONTROL DEVICES

BACKGROUND OF THE INVENTION

The present disclosure relates generally to controlling vehicle fluid flow (e.g., airflow) and, in particular, to control logic for reversibly deployable fluid flow control devices with a specific example being an air dam. As used herein, the term "control logic" refers to the logic in a controller that controls a device based on sensor input. The logic of the controller is applied to the sensor input to produce an output control signal for the controlled device. In this way, a fluid flow control device, such as an air dam is adjustable in response to varying conditions.

As used herein, the term "fluid flow" refers to the motion of fluid around and through parts of a vehicle relative to either the exterior surface of the vehicle or surfaces of elements of the vehicle along which exterior fluid flow can be directed. Fluid includes any type of liquid or gas, and the term fluid flow encompasses airflow. Fluid flow over, under, around, and/or through a vehicle can affect many aspects of vehicle performance including vehicle drag, vehicle lift and down force, and cooling/heat exchange for a vehicle powertrain and air conditioning systems. Reductions in vehicle drag improve fuel economy. As used herein, the term "airflow" refers to the motion of air around and through parts of a vehicle relative to either the exterior surface of the vehicle or surfaces of elements of the vehicle along which exterior airflow can be directed such as surfaces in the engine compartment. The term "drag" refers to the resistance caused by friction in a direction opposite that of the motion of the center of gravity for a moving body in a fluid. The term "lift" as used herein refers to the component of the total force due to fluid flow relative to vehicle acting on the vehicle in a vertically upward direction. The term "downforce" used herein refers to the component of total force due to fluid flow relative to the vehicle acting on a vehicle in a vertically downward direction.

Devices known in the art of vehicle manufacture to control fluid flow relative to a vehicle are generally of a predetermined, non-adjustable geometry, location, orientation and stiffness. Such devices generally do not adapt as driving conditions change, thus the fluid flow relative to the vehicle cannot be adjusted to better suit the changing driving conditions, such as deep snow, slush or rainfall. Additionally, current under-vehicle airflow control devices can reduce ground clearance. For example, vehicle designers are faced with the challenge of controlling the airflow while maintaining sufficient ground clearance over parking ramps, parking blocks, potholes, curbs and the like. There is a need for control logic for fluid flow control devices to provide situational tailoring of drag, lift, and cooling fluid flow for a wide range of driving scenarios and operating conditions to improve fuel economy, while providing sufficient ground clearance.

BRIEF DESCRIPTION OF THE INVENTION

According to one aspect of the invention, a system is provided for controlling a fluid flow control device. The system comprises a fluid flow control device, an obstacle sensor for detecting obstacles, and a controller. The fluid flow control device has a body with at least one surface and an actuation means in operative communication with the surface. The actuation means is operative to alter at least one attribute of the fluid flow control device in response to a control signal. The controller has control logic for generating the control signal in response to the obstacle sensor.

In another aspect of the invention, a method is provided for controlling fluid flow about a vehicle. Fluid flow sensor output associated with a fluid flow control device, vehicle attributes, including a speed, and obstacle sensor output are determined. Then, a signal to alter the fluid flow control device is transmitted. The signal is based on the fluid flow sensor output, the vehicle attributes, and the obstacle sensor output.

In yet another aspect of the invention, a computer program product is provided for controlling a fluid flow control device. The computer program product includes a storage medium readable by a processing circuit and storing instructions for execution by the processing circuit for performing a method. The method includes determining a fluid flow sensor output associated with a fluid flow control device; determining a plurality of vehicle attributes, the vehicle attributes including a speed; determining an obstacle sensor output; and transmitting a signal to alter the fluid flow control device based on the fluid flow sensor output, the vehicle attributes, and the obstacle sensor output.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

The present disclosure describes control logic for controlling a fluid flow control device for a vehicle. The fluid flow control device is capable of reversibly changing at least one of shape, dimension, orientation, location and/or stiffness, the change being effected through the activation of an actuation means, allowing the fluid flow control device to adapt to varying driving conditions. The actuation means may include, but is not limited to, one or more of an active material, a mechanical actuator, an electronic actuator, a hydraulic actuator, and combinations thereof. The actuation means may be attached internally and/or externally to the fluid flow control device. As used herein the term "vehicles" includes any structure subject to fluid flow including, but not intended to be limited to, automobiles, over the highway tractors, boats, motorcycles, and the like.

Figure 1:
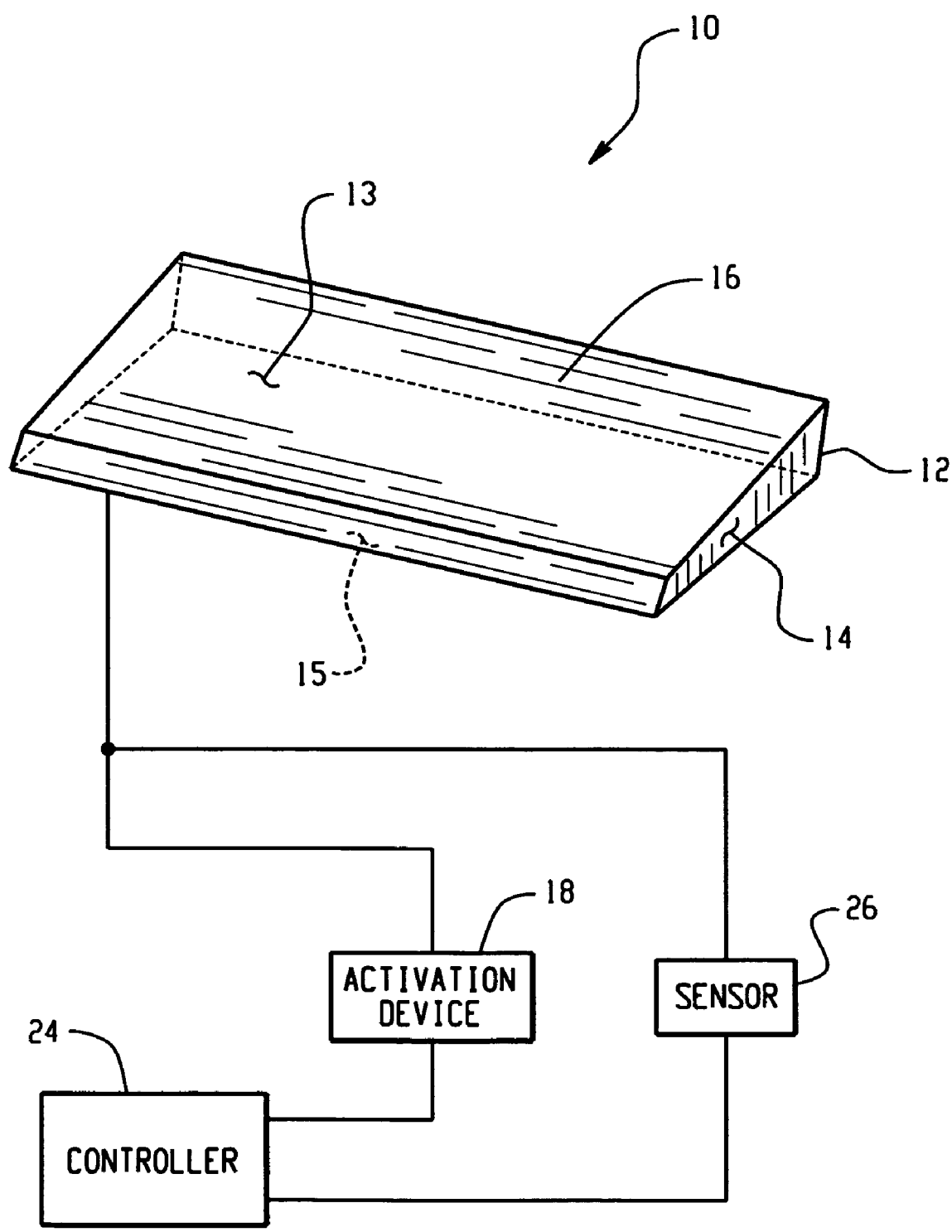
FIG. 1 is a perspective view of a fluid flow control device in accordance with exemplary embodiments of the present invention.

As shown in FIG. 1, a fluid flow control device for a vehicle, generally indicated as reference numeral 10, comprises a body portion 12 having at least one surface 13, 14, 15 and an actuation means 16 in operative communication with at least one surface 13, 14, 15 and/or the body portion 12, the actuation means 16 controlling at least one attribute on the fluid flow control device 10 that is operative to change in response to an activation signal to the actuation means 16. The changes in at least one attribute affects various features of the fluid flow control device 10 such as, but not limited to, shape, dimension, location, orientation, stiffness, combinations thereof, and/or the like, resulting in a change in the fluid flow across the fluid flow control device 10. In this manner, the fluid flow control device 10 is adjustable and fluid flow across the fluid flow control device 10 changes with the change in at least one attribute of the fluid flow control device 10 under varying driving conditions.

Exemplary embodiments of the present invention include a vehicle that is an automobile, a fluid flow control device 10 that is an air dam (i.e., an air flow control device) and an actuation means 16 that is an active material. Airflow control devices may be of any of a variety of configurations, including but not limited to, air dams; fender flares; side skirt cribs; cabs; rear and tailgate spoilers; louvers for controlling airflow through radiator, other heat exchangers, the engine compartment, over the drive train and transmission; and air and wind deflectors for roof tops, sunroofs, vent windows; and like configurations. An exemplary air dam comprises a projection of the body shell underneath the front of the chassis of a vehicle and functions to reduce the amount of air turbulence and drag underneath the vehicle, as well as channels cooling air to the radiator. Further, many airflow control devices improve vehicle stability and increase gas mileage. For example, at low speeds the air dam can be actively positioned so that additional ground clearance is provided, such as may be desired to clear speed bumps, provide curb clearance for parking, and the like. At higher speeds, the air dam can be actively positioned to divert the incoming airflow into the cooling system, or divert air about the vehicle to improve aerodynamics, improve vehicle stability, increase gas mileage, and the like. It will be understood that the airflow control device may be a portion of a vehicle louver system and/or an independent component of the vehicle.

Coupled to and in operative communication with fluid flow control device 10 is an activation device 18. The activation device 18 is in functional communication with the fluid flow control device 10 and/or the actuation means 16, and is operable to selectively provide an activation signal to the fluid flow control device 10 and change a feature of the fluid flow control device 10 by changing at least one attribute of the fluid flow control device 10. For example, in the case of an underflow airflow control device with an active material as the actuation means 16, the active material can retract or extend the airflow control device depending on the speed of the vehicle. The activation device 18, on demand, provides the activation signal or stimulus to the active material of the airflow control device to cause the change in one or more feature of at least a portion of the airflow control device.

In one embodiment, the change in feature generally remains for the duration of the applied activation signal. Upon discontinuation of the activation signal, the fluid flow control device 10 generally reverts to an unpowered form and returns substantially to the original at least one attribute, thus reverting the fluid flow control device 10 to the original feature and/or features. In another embodiment, the change in one or more attribute and/or feature of at least a portion of the fluid flow control device 10 may remain upon discontinuing the activation signal. In this embodiment, the fluid flow control device 10 includes a means to maintain the change in the fluid flow control device 10 such as a latch, lock, stop and/or the like. Upon release of the means, the fluid flow control device 10 reverts to the original at least one feature. The illustrated fluid flow control device 10 is exemplary only and is not intended to be limited to any particular shape, size, dimension or configuration, material, or the like.

In another embodiment, the fluid flow control device 10 includes at least one sensor 26 in operative communication with the fluid flow control device 10 and/or the actuation means 16, where the sensor is adapted to transmit signals indicative of at least one vehicle condition. This embodiment may further comprise a controller 24 that is operatively connected to the sensor 26 and the activation device 18, wherein the controller 24 includes control logic to cause the activation device 18 to provide an activation signal to the actuation means 16 when the sensor 26 signals indicate a predetermined vehicle condition.

The present disclosure is not intended to be limited to any particular activation signal. The particular activation signal will depend on the sensitivity of the actuation means 16. As such, the activation signal may provide a thermal activation signal, magnetic activation signal, electrical activation signal, chemical activation signal, and/or other like activation signal or combination of activation signals.

The fluid flow control devices of the present disclosure are able to adjust features such as shape, dimension, stiffness, location, combinations thereof, and the like by changing the at least one attribute of the fluid flow control device 10 to match the needs of different driving conditions. Changes in at least one attribute of the fluid flow control device 10 include shape, dimension, stiffness, combinations thereof and the like. Utilizing active materials as the actuation means 16 to affect changes to the fluid flow control device 10 may provide devices of increased simplicity and robustness, while reducing the number of failure modes, device volume and energy requirements for activation due to higher energy densities.

A method of controlling vehicle fluid flow is disclosed. In an exemplary embodiment, the method comprises positioning a fluid flow control device 10 so as to provide fluid flow in contact during movement of the vehicle, the fluid flow control device 10 comprising a body and an actuation means 16 in operative communication with the body, wherein the actuation means 16 is operative to change at least one attribute of the fluid flow control device 10 in response to an activation signal. Once positioned, an activation signal is selectively introduced to the actuation means 16. By selectively introducing the activation signal, at least one attribute of the fluid flow control device 10 changes. In another embodiment, the method includes discontinuing the activation signal to reverse the change of at least one attribute of the fluid flow control device 10. In an additional embodiment, the method includes maintaining the change in at least one attribute of the fluid flow control device 10 upon discontinuation of the activation signal.

FIGS. 2–7 illustrate specific exemplary methods for controlling various aspects of vehicle fluid flow, such as controlling aerodynamic drag and lift forces detecting obstacles. In the examples depicted in FIGS. 2–7, the fluid flow control device 10 is an airflow device. In FIGS. 2–7, control logic is used to produce signals to control the airflow control device.

Figure 2:
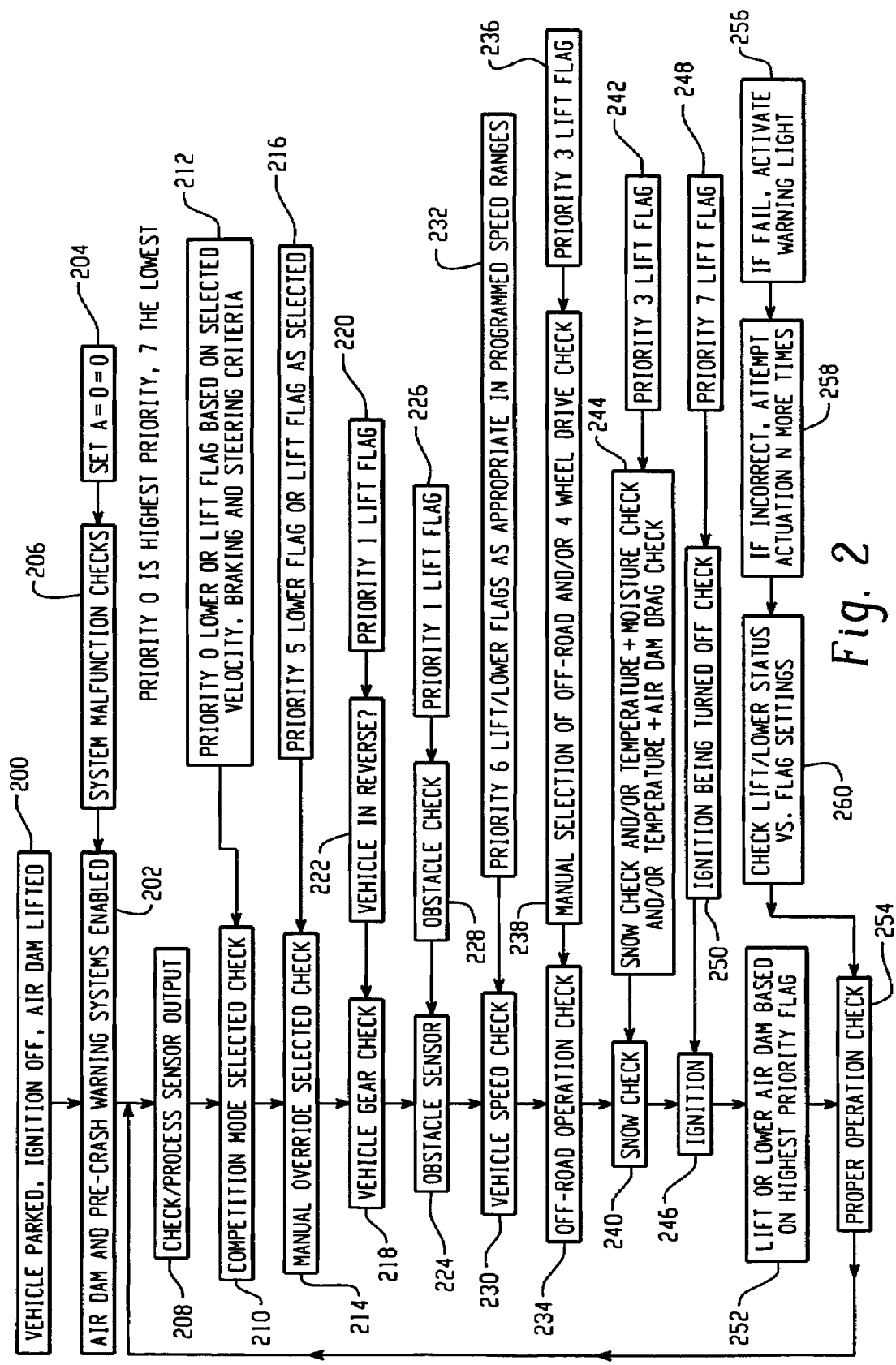
FIG. 2 is a flowchart of an exemplary aerodynamic drag function in accordance with exemplary embodiments of the present invention.

FIG. 2 shows exemplary control logic for controlling aerodynamic drag and lift forces. Many factors may be used by the control logic to determine whether to change an airflow control device, including a selection of a competition mode, a selection of a manual override, a vehicle gear check, a sensor detection of an obstacle, an off-road operation, a snow check, and an ignition check. In the exemplary control logic shown in FIG. 2, the airflow control device is an air dam that is deployed or stored, lifted or lowered to control drag and lift.

When the vehicle is parked and the ignition is off, the air dam is lifted at 200. Then, the air dam and pre-crash warning systems are enabled at 202, after variables are initialized at 204 and system malfunction checks at 206 are performed. Next, sensor output is checked and processed at 208 by altering the airflow control device (See FIG. 1) according to the priorities of the lift flags currently set. Competition mode selection is checked at 210 and a priority zero flag is set to lower or lift the air dam based on selected velocity, braking and steering criteria at 212. Flags have a priority of zero to seven, zero being the highest priority and seven the lowest. Manual override selection (to deploy or stow) by the driver is checked at 214 and a priority five flag is set to lower or lift the air dam as selected at 216. The vehicle gear is checked (stow if in reverse) at 218 and a priority one lift flag is set at 220, if it is in reverse at 222. A sensor check (e.g., radar, ultrasonics, vision based) of an obstacle (e.g., a parking block, parking garage ramp, road debris) at 224 sets a priority one lift flag at 226 and checks for obstacles at 228.

Figure 3:
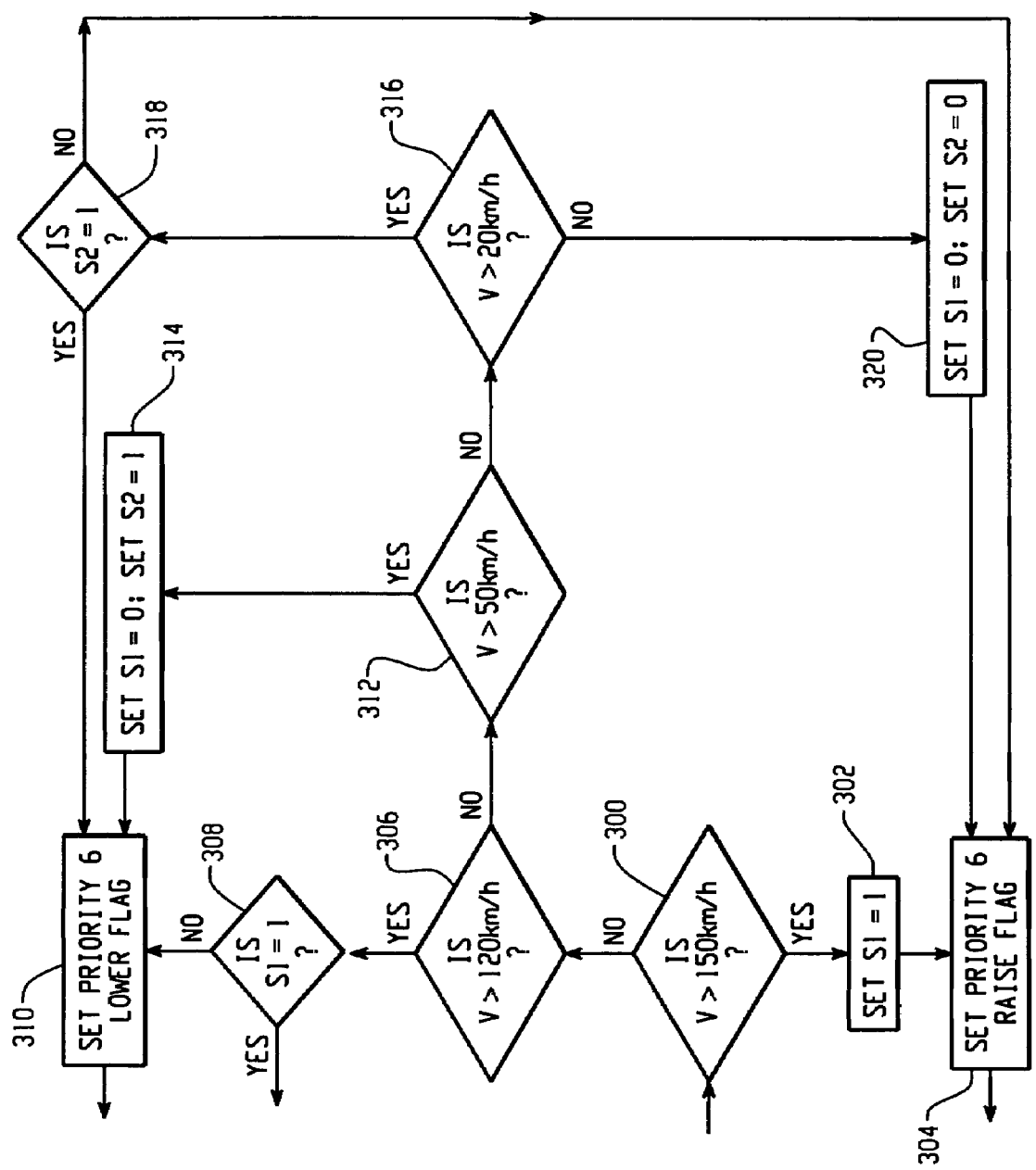
FIG. 3 is a flowchart of an exemplary vehicle velocity function in accordance with exemplary embodiments of the present invention.

A vehicle speed check at 230 sets priority six lift or lower flags as appropriate in predetermined speed ranges at 232 (See FIG. 3). An off-road operation check at 234 sets a priority three lift flag at 236 based on a manual selection of off-road and/or a four-wheel drive check at 238. Off-road operation may include a manual selection by the driver, selection of full time four-wheel driver, or a sensor that is ride or obstacle based to detect severe path unevenness. A snow check at 240 sets a priority three lift flag at 242 based on a snow check and/or a temperature and moisture check and/or a temperature and air dam drag check at 244. The snow check may be directly through a sensor that, for example, measures vehicle drag, decrease in ground clearance and the like and alternatively or in addition to sensor measurement, the download of information via a communications system. An ignition check at 246 sets a priority seven lift flag at 248 based on an ignition being turned off check at 250. Then, the air dam is lifted or lowered based on the highest priority flag at 252. A proper operation check at 254 activates a warning light if there is a failure at 256 and attempts actuation a predetermined number of times at 258 if a check of lift/lower status against the flag settings is incorrect at 260.

The exemplary control logic shown in FIG. 2 continues in a loop from checking and processing sensor output at 208 to the proper operation check at 254. Each time through the loop, a check is made of each factor and then an action is taken to deploy or stow the air dam based on the highest priority flag. Alternate embodiments of the control logic have different input factors, have different priority schemes, send control signals other than lift and lower to the airflow control device, consider other factors, consider more or less factors, and consider factors in a different order.

Figure 5:
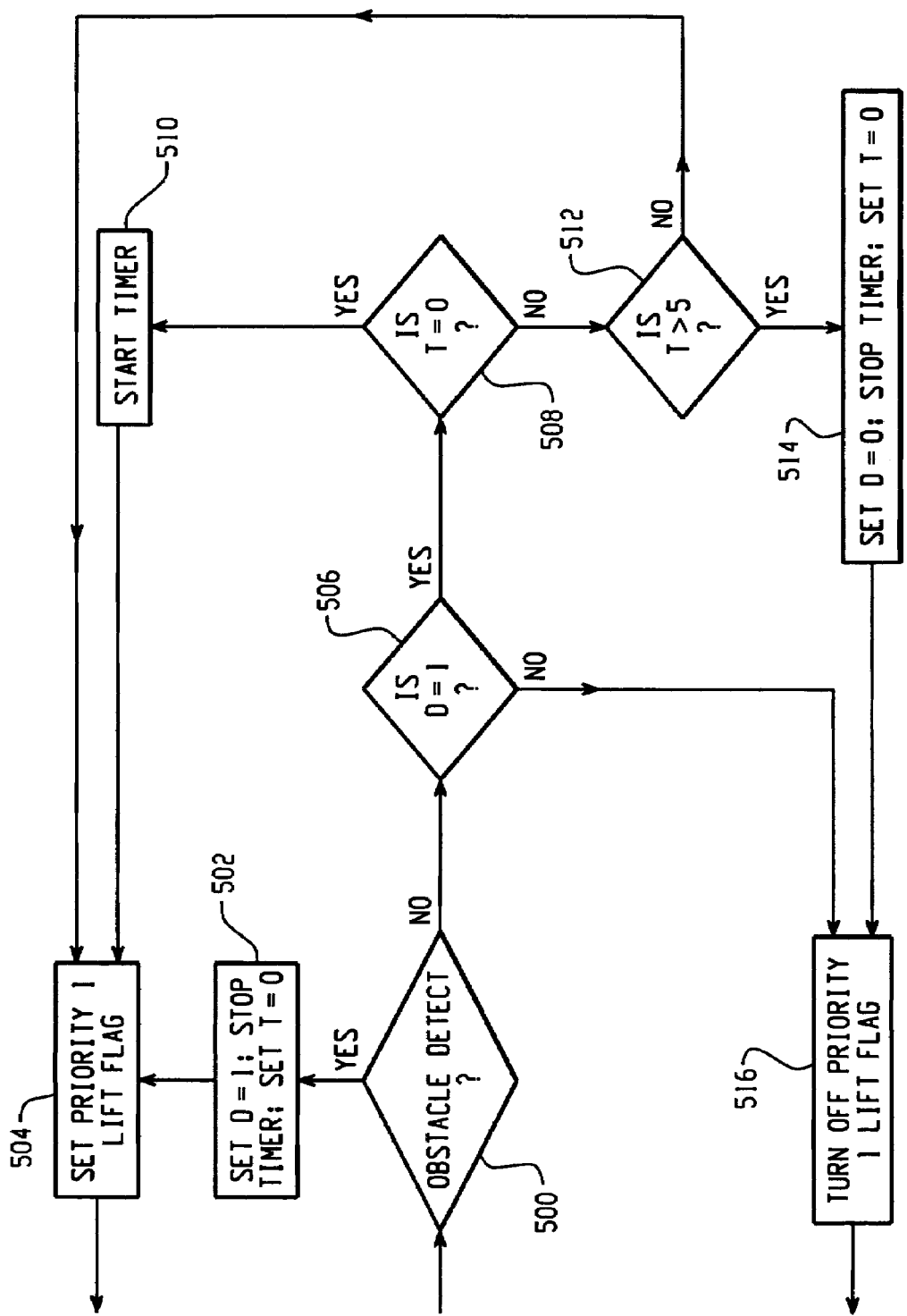
FIG. 5 is a flowchart of an exemplary obstacle detection function in accordance with exemplary embodiments of the present invention.
Figure 6:
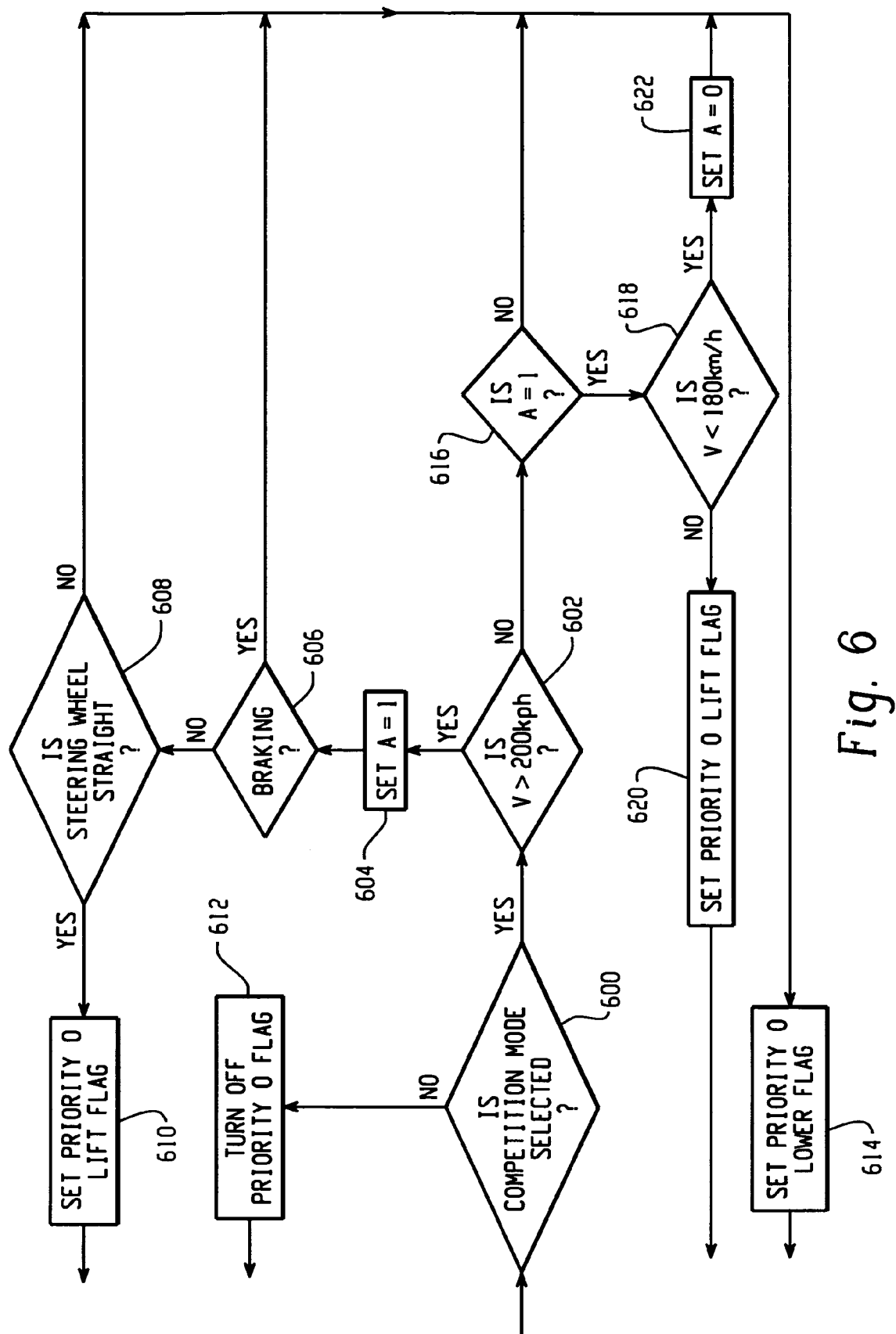
FIG. 6 is a flowchart of an exemplary competition mode function in accordance with exemplary embodiments of the present invention.

FIGS. 3, 5, and 6 are specific examples of the embedded logic for three of the control factors of FIG. 2, specifically vehicle speed check at 230 (in which hysteresis is built in to avoid rapid frequent cycling of the air dam), obstacle detection at 224, and competition mode selected check at 210 (in which the air dam is lifted at high speed on straight-a-ways, but lowered to reduce lift when maneuvering/braking/cornering).

FIG. 3 shows more detail of the vehicle speed check at 230 in FIG. 2 that sets priority six lift or lower flags as appropriate in predetermined speed ranges at 232. First, it is determined whether the vehicle speed (V) is greater than a first predetermined threshold at 300, for example 150 km/h. If the vehicle speed is greater than the first predetermined threshold, then a first variable is set to one (e.g., S1=1) at 302 and the priority six lift flag is set at 304 as input to the vehicle speed check at 230 in FIG. 2. Otherwise, if the vehicle speed is not greater than the first predetermined threshold, then it is determined whether the vehicle speed is greater than a second, lower predetermined threshold at 306, (e.g., 120 km/h). If the vehicle speed is greater than the second predetermined threshold, then it is determined whether the first variable is set to one (e.g. Is S1=1?) at 308 and if S1 is not one (e.g., S1≠1) the priority six lower flag is set at 310 as input to the vehicle speed check at 230 in FIG. 2. Otherwise, if the vehicle speed is not greater than the second predetermined threshold, then it is determined whether the vehicle speed is greater than a third predetermined threshold (e.g., 50 km/h) at 312.

If the vehicle speed is greater than the third predetermined threshold, then the first variable is set to zero and a second variable is set to one (e.g., S1=0, S2=1) at 314 and the priority six lower flag is set at 310 as input to the vehicle speed check at 230 in FIG. 2. Otherwise, if the vehicle speed is not greater than the third predetermined threshold, then it is determined whether the vehicle speed is greater than a fourth predetermined threshold (e.g., 20 km/h) at 316. If the vehicle speed is greater than a fourth predetermined threshold, then it is determined whether the second variable is one at 318. If the second variable is one, then the priority six lower flag is set at 310 as input to the vehicle speed check at 230 in FIG. 2. Otherwise, if the second variable is not one, then the priority six raise flag is set at 304 as input to the vehicle speed check at 230 in FIG. 2. If at 316 the vehicle speed is not greater than a fourth predetermined threshold, then the first and second variables are set to zero (e.g., S1=0; S2=0) at 320 and the priority six raise flag is set at 304 as input to the vehicle speed check at 230 in FIG. 2. In the example shown in FIG. 3, four predetermined velocity thresholds are checked, but alternate embodiments may check more or less velocity thresholds and in a different order. The first and second variables are used to keep track of previous velocity ranges, however alternate embodiments have other methods of doing so.

Figure 4A:
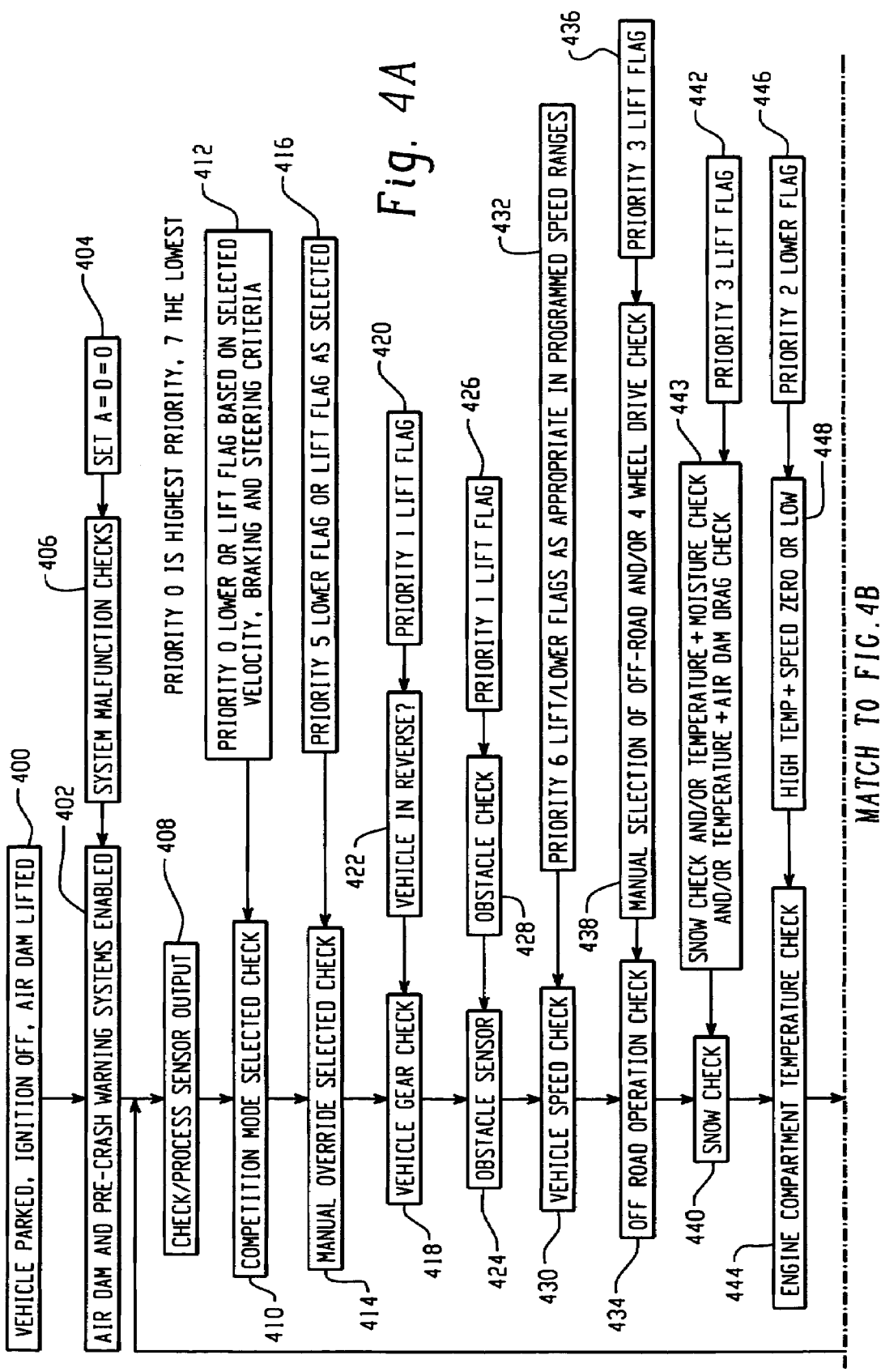
FIGS. 4A and 4B are a flowchart of exemplary engine compartment cooling and aerodynamic drag functions in accordance with exemplary embodiments of the present invention.
Figure 4B:
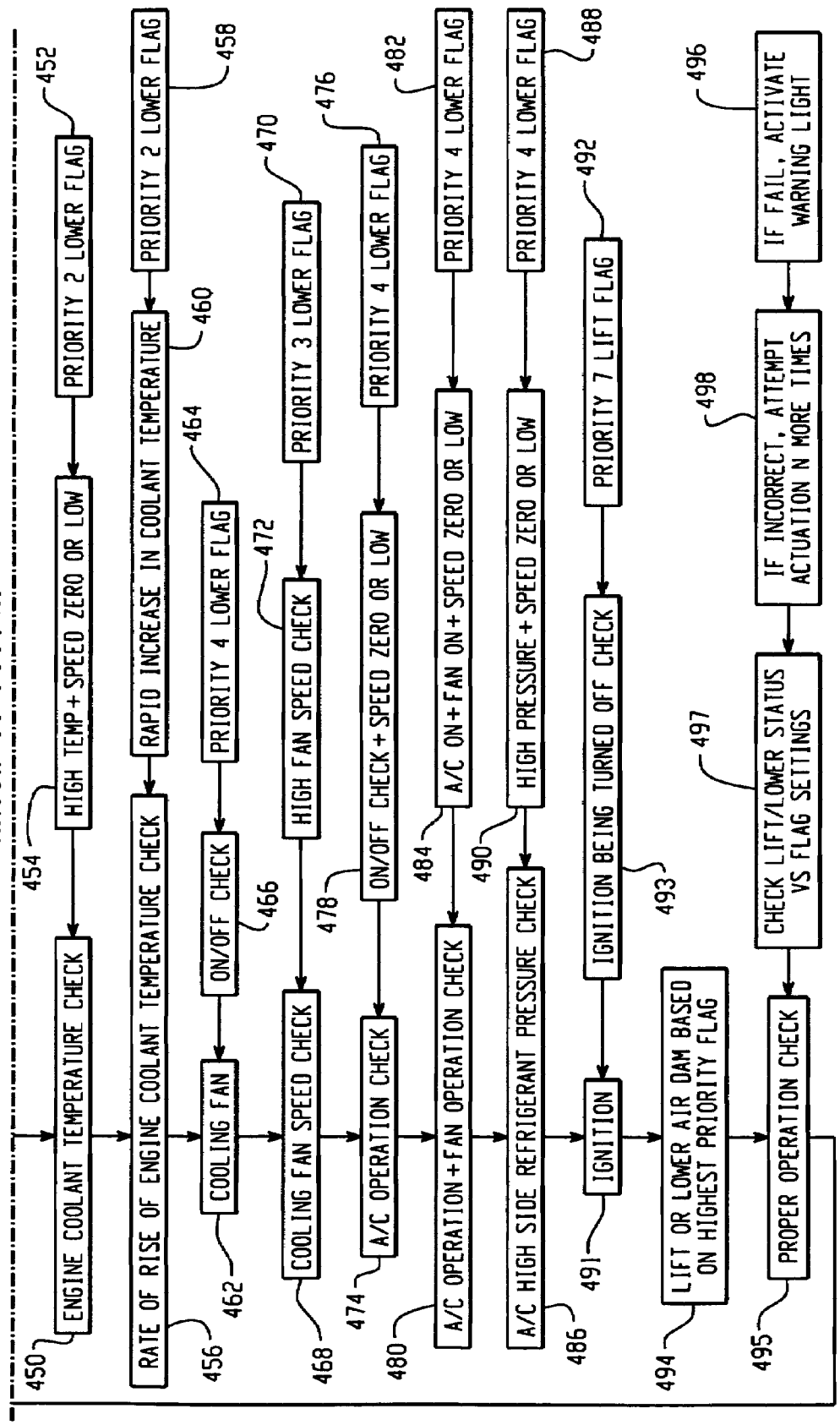

FIGS. 4A and 4B show exemplary control logic for an air dam that has primary functions of both cooling and drag control. Many factors may be used by the control logic to change the air flow controlling device, such as engine compartment temperature, engine coolant temperature, rate of rise of engine coolant temperature, cooling fan operation (e.g., high side refrigerant pressure), cooling fan speed, A/C operation (e.g., down during 'A/C on' idles and low speed driving to minimize fan discharge recirculation, including parked vehicles), simultaneous A/C and fan operation, and A/C high side refrigerant pressure check (i.e., the head pressure is an indication of condenser effectiveness, combining airflow and ambient temperature). In the exemplary control logic shown in FIGS. 4A and 4B, the airflow control device is an air dam which is lifted or lowered based on a particular set of factors.

When the vehicle is parked and the ignition is off, the air dam is lifted at 400 and the air dam and pre-crash warning systems are enabled at 402, after initializing variables at 404 and checking for system malfunctions at 406. Then, sensor output is checked and processed at 408 by altering the airflow control device 10 (See FIG. 1) according to the priorities of the lift flags currently set. A competition mode selected check at 410 sets a priority zero lower or lift flag based on selected velocity, braking, and steering criteria at 412. Next, a manual override selected check at 414 sets a priority five lower flag or lift flag as selected at 416. A vehicle gear check at 418 sets a priority one lift flag at 420 if the vehicle is in reverse at 422. An obstacle sensor at 424 sets a priority one lift flag at 426 based on an obstacle check at 428. A vehicle speed check at 430 sets priority six lift or lower flags as appropriate in programmed speed ranges at 432. An off-road operation check at 434 sets a priority three lift flag at 436 based on a check for manual selection of off-road and/or four-wheel drive at 438. A snow check at 440 sets a priority three lift flag at 442 based on a snow check and/or moisture check and/or temperature check and air dam drag check at 443. An engine compartment temperature check at 444 sets a priority two lower flag at 446 when there is a high temperature and a low speed or speed of zero at 448. An engine coolant temperature check at 450 sets a priority two lower flag at 452 when there is a high temperature and a low speed or speed of zero at 454. A rate of rise of engine coolant temperature check at 456 sets a priority two lower flag at 458 when there is a rapid increase in coolant temperature at 460. A cooling fan check at 462 sets a priority four lower flag at 464 based on an on/off check at 466. A cooling fan speed check at 468 sets a priority three lower flag at 470 based on a high fan speed check at 472. An A/C operation check at 474 sets a priority four lower flag at 476 based on an on/off check when there is a low speed or speed of zero at 478.

An A/C operation and fan operation check at 480 sets a priority four lower flag at 482 when the A/C is on and the fan is on and there is a low speed or speed of zero at 484. An A/C high side refrigerant pressure check at 486 sets a priority four lower flag at 488 when there is high pressure and a low speed or a speed of zero at 490. An ignition check at 491 sets a priority seven lift flag at 492 based on an ignition being turned off check at 493. Then, the air dam is lifted or lowered based on the highest priority flag at 494 and there is a proper operation check at 495 that activates a warning light upon failure at 496, after checking the lift/lower status against flag settings at 497 and, if the lift/lower status disagrees with the flag settings, attempting actuation a predetermined number of times at 498.

The exemplary control logic shown in FIGS. 4A and 4B continues in a loop from checking and processing sensor output at 408 to the proper operation check at 495. Each time through the loop, a check is made of each factor and then an action is taken to lift or lower the air dam based on the highest priority flag. Alternate embodiments of the control logic have different input factors, have different priority schemes, send control signals other than lift and lower to the airflow control device, consider other factors, consider more or less factors, and consider factors in a different order.

FIG. 5 shows exemplary control logic for obstacle detection, which is shown in FIGS. 2 and 4A (obstacle sensor at 224 and at 424). The control logic in FIG. 5 receives input from and sends output to the obstacle sensor at 224 and at 424, the input being whether an obstacle was detected and the output being a priority one lift flag that is set or turned off. First, it is determined whether an obstacle was detected at 500. If an obstacle was detected, then a detected flag is set (D=1), a timer is stopped (T=0) at 502, and a priority one lift flag is set at 504. Otherwise, if no obstacle was detected, then it is determined if one was previously detected (D=1?) at 506. If an obstacle was previously detected at 500, then it is determined if the timer is zero (T=0?) at 508. If an obstacle was previously detected at 500 and the time variable is zero, then the timer is started at 510 and the priority one lift flag is set at 504. Otherwise, if an obstacle was previously detected at 500 and the timer is not zero at 508, then it is determined whether the timer is greater than five (T>5?) at 512. If the time variable is greater than five, then the detected flag is set to zero (D=0), the timer is stopped (T=0) at 514, and the priority one lift flag is turned off at 516. The priority one lift flag is also turned off at 516 if no obstacle was detected at 500 and in addition no obstacle was previously detected at 506 (i.e., D≠1). If, at 512, it is determined that the timer is less than or equal to five (T<=5), then the lift flag is set to priority one at 504.

FIG. 6 shows exemplary control logic for the competition mode selected check at 210 and at 410 shown in FIGS. 2 and 4A. The control logic in FIG. 6 receives input from and sends output to the competition mode selected check at 210 and at 410, the input being whether the competition mode is selected and the output being a priority zero lift or lower flag that is set or turned off. First, it is determined whether the competition mode is selected at 600. If the competition mode is selected, then it is determined whether the vehicle speed is greater than a first predetermined speed (e.g., V>200 km/h) at 602. If the vehicle speed is greater than the first predetermined speed, then a flag is set (A=1) at 604 and it is determined whether braking is occurring at 606. If braking is not occurring, then it is determined whether the steering wheel is straight at 608. If the steering wheel is straight, then the priority zero lift flag is set at 610. If the competition mode is not selected at 600, then the priority zero flag is turned off at 612. If the steering wheel is not straight at 608 or braking is occurring at 606, then the priority zero lower flag is set at 614. If the vehicle speed is not greater than the first predetermined speed at 602, then it is determined whether the flag was set at 616, indicating that previously the speed was greater than the first predetermined speed. If the flag was set at 616, then it is determined whether the vehicle speed is less than a second predetermined speed (e.g., V<180 km/h?) at 618. If the vehicle speed is not less than the second predetermined speed, then the priority zero lift flag is set at 620. Otherwise, if the vehicle speed is less than the second predetermined speed, the flag is set to zero (A=0) at 622 and the priority zero lower flag is set at 614. If the vehicle speed is not greater than the first predetermined speed at 602 and the flag is not set at 620, then the priority zero lower flag is set at 614.

Figure 7:
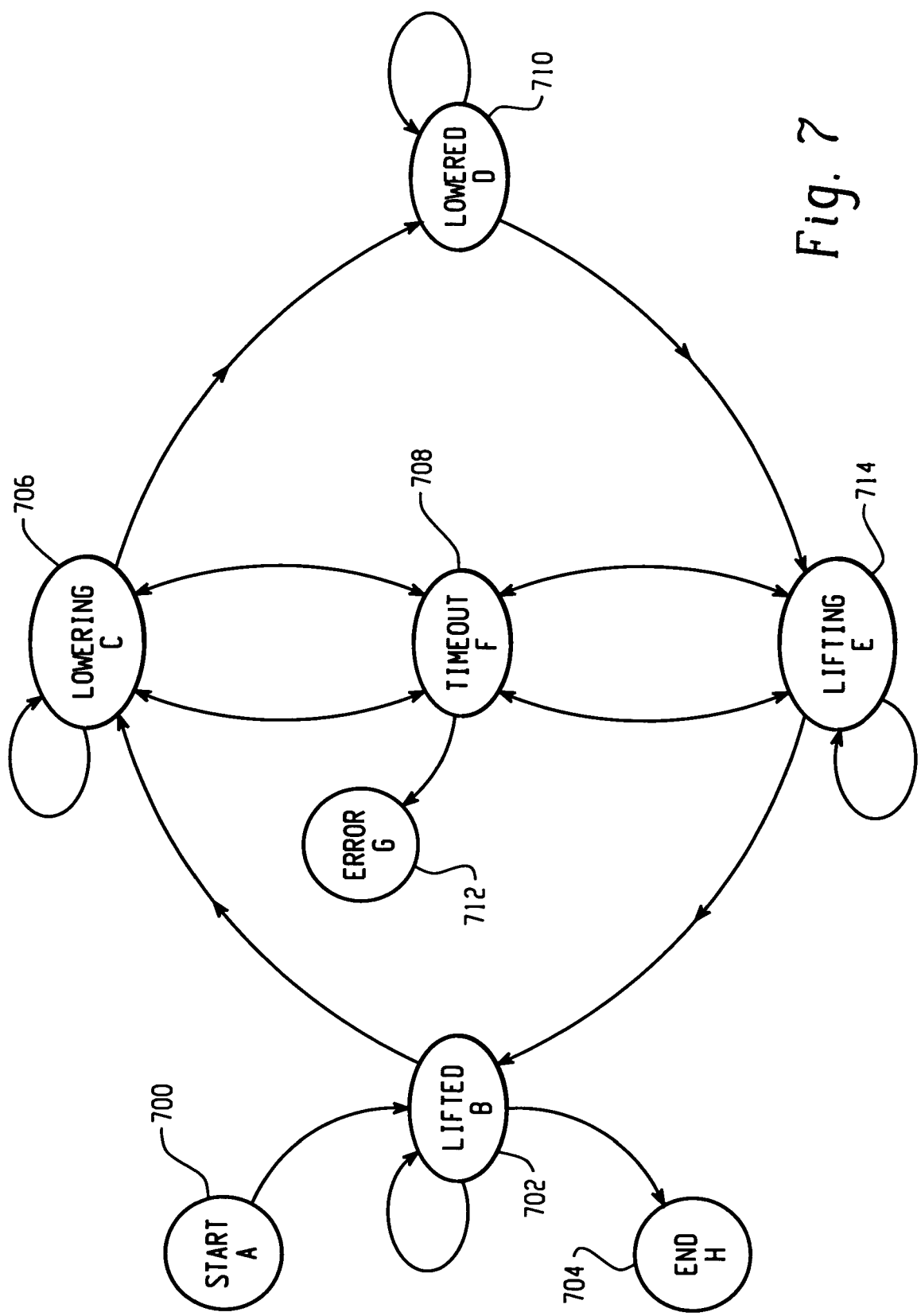
FIG. 7 is a flowchart of an exemplary state machine in accordance with exemplary embodiments of the present invention.

FIG. 7 depicts an exemplary state machine corresponding to some exemplary loop logic in Table 1 that might be used in a software implementation of various embodiments. This typical loop logic uses a priority table, such as the one shown in Table 2. The state machine of FIG. 7 shows a start state 700 transitioning to a lifted state 702. The lifted state 702 can transition to itself, to an end state 704, or a lowering state 706. The lowering state can transition to itself, to a timeout state 708 or to a lowered state 710. The timeout state 708 can transition to an error state 712, the lowering state 706, or a lifting state 714. The lowered state 710 can transition to itself or the lifting state 714. The lifting state 714 can transition to itself, the timeout state 708, or the lifted state 702.

check# 9 containing a lift flag at priority three. This would indicate that an off road or four wheel drive condition is commanding the device to be lifted. In the loop logic shown

TABLE 1

Typical Loop Logic

```
Set Current State to START(A)        // Perform any sensor initializations and then transition to LIFTED(B)
Loop (Forever)
    Starting at check #1 (1st column) in the Priority Table (see below), locate the highest priority (2nd column, 0=highest)
    with a 1 in the LIFT column for the enabled control logic (Drag, Cooling, or either if logic for both controls is
    required)
    Set LiftCheck# to this check#
    Starting at check #1 (1st column) in the Priority Table (see below), locate the highest priority (2nd column, 0=highest)
    with a 1 in the LOWER column for the enabled control logic (Drag, Cooling, or either if logic for both controls is
    required)
    Set LowerCheck# to this check#
    If Current State is LIFTED(B)
        If Lower Check# < LiftCheck#        //Indicates that the highest priority is to lower the device
            transition to LOWERING(C)
        EndIf
    Else If current state is LOWERING(C)
        If air dam status from Device Table (see below) indicates lowered transition to LOWERED(D)
        Else if device status from Device Table indicates TIMEOUT
            transition to TIMEOUT(F)
        EndIf
    Else If current state is LOWERED(D)
        If LiftCheck# < LowerCheck#         //Indicates that the highest priority is to lift the device
            transition to LIFTING(E)
        EndIf
    Else If current state is LIFTING(E)
        If air dam status from Device Table indicates lifted
            transition to LIFTED(B)
        Else if air dam status from Device Table indicates TIMEOUT
            transition to TIMEOUT(F)
        EndIf
    Else if current state is TIMEOUT(F)
        If a maximum number of timeouts has been reached
            transition to ERROR(G)
        Else If Lower Check# < LiftCheck#
            transition to LOWERING(C)       //Restart a lowering operation
        Else If Lift Check# < Lower Check#
            transition to LIFTING(E)        // Restart a lifting operation
        EndIf
    Else if current state is ERROR(G)
        Utilize appropriate recovery logic to attempt to re-start the air dam deployment and inform the user via a
        suitable mechanism
    EndIf
End Loop
```

Various embodiments of the loop logic allow for potentially different implementations of a fluid flow control device, such as an air dam, in production environments. The logic for drag control, cooling control, or a combination of both could be enabled via calibration parameters for the air dam device. Note that based on the specific implementation, either lifting or lowering of the air dam may be activated simply by a mechanical "Return to Home" latching mechanism. Also note that based on implementation, the device might be designed to go directly from lowering to lifting or from lifting to lowering without completing the current operation. To perform this, the state chart diagram depicted in FIG. 7 would include direct state change operations drawn between the lifting and lowering states.

In an example embodiment, a priority table, such as the one shown in Table 2, is implemented in software and contains information about individual logic checks, priorities, and other related fields. The columns labeled "Lift" and "Lower" are used to store the request true/false values at any given time during vehicle operation. Note that in the priority column, zero is the highest priority. In the example table shown below, if only drag control was enabled for a specific implementation, the highest priority check# flag would be in Table 1 above, this condition triggers lifting of the air dam. If both drag and cooling control are enabled in the implementation, the highest priority check# in this example table would be a check# 5 which contains a lower flag at priority two. This would indicate that engine compartment cooling is commanding that the device be lowered. The logic above would cause the air dam to be lowered in this situation. The lift and lower flags may be implemented as variables accessed through priority level bit masks, where each bit in the mask corresponds to a priority level.

TABLE 2

An Example Priority Table with Some Sample Lift and Lower Flags Current Setting

| Check# | Priority | Check Name | Lift | Lower | Enabling Logic |
|---|---|---|---|---|---|
| 1 | 0 | Competition Mode Selected | 0 | 0 | Drag |
| 2 | 1 | Gear Check | 0 | 0 | Drag |
| 3 | 1 | Obstacle Check | 0 | 0 | Drag |
| 4 | 2 | Engine Compartment | 0 | 0 | Cooling |

TABLE 2-continued

An Example Priority Table with Some Sample Lift and Lower Flags Current Setting

| Check# | Priority | Check Name | Lift | Lower | Enabling Logic |
|---|---|---|---|---|---|
| 5 | 2 | Temperature Engine Compartment Cooling | 0 | 1 | Cooling |
| 6 | 2 | Rate of Engine Compartment Temp Rise | 0 | 1 | Cooling |
| 7 | 3 | Snow, moisture | 0 | 0 | Drag |
| 8 | 3 | Cooling Fan Speed Check | 0 | 1 | Cooling |
| 9 | 3 | Off Road or 4 Wheel Drive | 1 | 0 | Drag |
| 10 | 4 | Cooling Fan ON/OFF | 1 | 0 | Cooling |
| 11 | 4 | A/C ON/OFF | 0 | 1 | Cooling |
| 12 | 4 | Cooling Fan + A/C (checks 8 + 11) | 0 | 0 | Cooling |
| 13 | 4 | A/C High Side Refrigerant pressure | 0 | 0 | Cooling |
| 14 | 5 | Manual Override Switch | 0 | 0 | Drag |
| 15 | 6 | Vehicle Speed | 0 | 0 | Drag |
| 16 | 7 | Ignition | 0 | 1 | Drag |

In order for the example software embodiments to build and maintain the current settings in the priority table, a device/sensor table, such as the one shown in Table 3 may be created. This table contains the name and current status of every device or sensor on the vehicle that the logic utilizes to make deployment determinations. Software is running in a vehicle to fill this table through various mechanisms. These mechanisms might include: software that does sensor polling via directly connected input/output (IO) devices or dedicated sensor/actuator buses; software that receives messages over a vehicle communication bus from another subsystem; software that is triggered asynchronously via hardware device interrupts; and other mechanisms.

TABLE 3

Device/Sensor Table

| Device or Sensor Name | Device Status |
|---|---|
| Vehicle Gear Selector ParkReverseNeutralDriveLow | Current Value (one of Park, Reverse, Drive . . . ) |
| Obstacle | Current State (True, False) |
| Engine Compartment Temperature | Current value |
| Engine Cooling Temperature | Current value |
| Cooling Fan | Current State (ON/OFF) |
| Cooling Fan Speed | Current Value |
| Vehicle Speed | Current value |
| Air Dam status | Current State (one of Lowered, Lifted, Lowering, Li Timeout) |
| Snow, moisture | Current State (True, False) |
| Ignition | Current State (ON/OFF) |
| Competition mode sensors | Current State (Multiple values) |
| Manual override switch | Current Setting (Lift or Lower) |
| Off Road Sensor | Current State (True, False) |
| Air Conditioning status | Current State (ON/OFF) |
| AC Refrigerant Pressure | Current value |

The disclosed invention controls vehicle fluid flow using control logic for the fluid flow control device 10. The disclosed invention has many advantages, including adjusting the fluid flow control device 10 to adapt to changing driving conditions, providing sufficient ground clearance to avoid obstacles, adapting to inclement weather, such as snow, and improving fuel economy. As described above, the fluid flow control device 10 may be implemented with any liquid flow or gas flow control device. In addition, the actuation means 16 is not limited to an active material but may include other actuation means (e.g., a solenoid, a motor, a pump and a piston) for changing an attribute on the fluid flow control device 10.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for controlling a fluid flow control device, comprising:
   a fluid flow control device having a body with at least one surface and an actuation means in operative communication with the at least one surface, the actuation means being operative to alter at least one attribute of the fluid flow control device in response to a control signal;
   an obstacle sensor connected to the fluid control device for detecting an obstacle; and
   a controller associated with the obstacle sensor having control logic for generating the control signal, in response to the obstacle sensor.

2. The system of claim 1, further comprising:
   an activation device interposed between the fluid flow control device and the controller, the activation device being capable of activating or deactivating the actuation means based on the control signal.

3. The system of claim 1, wherein the fluid flow control device is capable of being positioned on a surface of a vehicle.

4. The system of claim 1, wherein the fluid flow control device is reversibly deployable.

5. The system of claim 4, wherein the fluid flow control device is an air dam.

6. The system of claim 4, further comprising:
a velocity sensor to detect vehicle speed;
wherein the controller generates the control signal in response to both the velocity sensor and the obstacle sensor.

7. The system of claim 1, wherein the fluid flow control device is an airflow device.

8. The system of claim 1, wherein the actuation means is an active material.

9. The system of claim 1, wherein the actuation means is one or more of an active material, a mechanical actuator, an electronic actuator and a hydraulic actuator.

10. A method of controlling fluid flow about a vehicle, comprising:
determining a fluid flow sensor output associated with a fluid flow control device;
determining a plurality of vehicle attributes, the vehicle attributes including a speed;
determining an obstacle sensor output; and
transmitting a signal to alter the fluid flow control device based on the fluid flow sensor output, the vehicle attributes, and the obstacle sensor output.

11. The method of claim 10, wherein the fluid flow control device is an airflow device.

12. The method of claim 11, further comprising:
determining a snow sensor output;
wherein transmitting signals to alter the airflow control device is further based on the snow sensor output.

13. The method of claim 11, wherein the vehicle attributes further include one or more of: a competition mode, an ignition setting, whether an off-road operation is selected, a gear, and whether a manual override is selected.

14. The method of claim 11, wherein the vehicle attributes further include one or more of: engine compartment temperature, engine coolant temperature, rate of change in engine coolant temperature, cooling fan state, cooling fan speed, air conditioning state, air conditioning speed, and air conditioning refrigerant pressure.

15. The method of claim 11, wherein the air flow device is reversibly deployable.

16. The method of claim 15, wherein the airflow device is an air dam.

17. The method of claim 16, wherein altering the air dam includes lifting or lowering.

18. A computer program product for controlling a fluid flow control device, the computer program product comprising:
a storage medium readable by a processing circuit and storing instructions for execution by the processing circuit for performing a method comprising:
determining a fluid flow sensor output associated with a fluid flow control device;
determining a plurality of vehicle attributes, the vehicle attributes including a speed;
determining an obstacle sensor output; and
transmitting a signal to alter the fluid flow control device based on the fluid flow sensor output, the vehicle attributes, and the obstacle sensor output.

* * * * *